United States Patent
Gustavsson et al.

(10) Patent No.: US 7,616,944 B2
(45) Date of Patent: Nov. 10, 2009

(54) METHOD AND APPARATUS FOR CALL NOTIFICATION AND DELIVERY TO A BUSY MOBILE STATION

(75) Inventors: Roger Gustavsson, Sollentuna (SE); Vibhor Julka, San Diego, CA (US); Anders Lundstrom, LaJolla, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1064 days.

(21) Appl. No.: 10/657,446

(22) Filed: Sep. 8, 2003

(65) Prior Publication Data
US 2004/0092252 A1    May 13, 2004

Related U.S. Application Data

(60) Provisional application No. 60/409,155, filed on Sep. 9, 2002.

(51) Int. Cl.
*H04M 11/10* (2006.01)
(52) U.S. Cl. ............ 455/412.2; 455/412.1; 455/413; 370/352; 370/353
(58) Field of Classification Search ............ 455/412.2, 455/412.1–2, 413, 406, 458; 370/338, 88.12, 370/352–356
See application file for complete search history.

(56) References Cited

U.S. PATENT DOCUMENTS

| | | | | |
|---|---|---|---|---|
| 6,111,866 A * | 8/2000 | Kweon et al. | ............... | 370/335 |
| 6,141,556 A * | 10/2000 | Dougherty et al. | ........... | 455/445 |
| 6,307,845 B1 * | 10/2001 | Hummelgren et al. | ...... | 370/328 |
| 6,630,883 B1 * | 10/2003 | Amin et al. | ................ | 340/7.29 |
| 6,636,506 B1 * | 10/2003 | Fan | .............................. | 370/356 |
| 6,693,897 B1 * | 2/2004 | Huang | ........................ | 370/352 |
| 6,711,401 B1 * | 3/2004 | Chow et al. | ............... | 455/414.1 |
| 6,754,316 B2 * | 6/2004 | Kafri | ........................ | 379/93.23 |
| 6,842,622 B2 * | 1/2005 | Peters et al. | ................. | 455/458 |

(Continued)

FOREIGN PATENT DOCUMENTS

EP    0959593    4/1999

(Continued)

OTHER PUBLICATIONS

S. Athalye, L. Chan, D. Ott, R. Sinnarajah; Voice Precedence; $3^{rd}$ Generation Partnership Project 2 "3GPP2" TSG-A; Mar. 17, 2003; 11 pgs.

*Primary Examiner*—CongVan Tran
(74) *Attorney, Agent, or Firm*—Coats & Bennett, P.L.L.C.

(57) ABSTRACT

A call handling method and apparatus provide improved call handling in scenarios where concurrent voice and data service is not supported, or is not possible. A wireless communication network can be configured to provide real-time notifications of incoming voice calls to mobile stations that are busy in data calls, and can route those incoming voice call to voice mail, etc. The network can be configured to attempt call delivery of an incoming voice call to a mobile station busy in a data call with or without prompting the mobile station user, depending on the type of data service the mobile station is engaged in. According to exemplary embodiments, the traffic channel and other resources as desired are retained from the data call for use in supporting the voice call. Also, the mobile stations can be configured to support such notification, reconfiguration and channel retention processing.

14 Claims, 6 Drawing Sheets

U.S. PATENT DOCUMENTS

| | | | |
|---|---|---|---|
| 7,062,264 B2 * | 6/2006 | Ko et al. | 455/423 |
| 2002/0102962 A1 * | 8/2002 | Grinn et al. | 455/406 |
| 2002/0194331 A1 * | 12/2002 | Lewis et al. | 709/224 |
| 2005/0226178 A1 * | 10/2005 | Forand et al. | 370/328 |
| 2006/0036517 A1 * | 2/2006 | Walter | 705/29 |

FOREIGN PATENT DOCUMENTS

| | | |
|---|---|---|
| JP | 2002064867 | 2/2002 |
| JP | 2002135440 | 5/2002 |
| WO | WO 985115 | 11/1998 |
| WO | WO 0233938 | 4/2002 |
| WO | WO 02056568 | 7/2002 |
| WO | WO 02069659 | 9/2002 |

* cited by examiner

METHOD AND APPARATUS FOR CALL NOTIFICATION AND DELIVERY TO A BUSY MOBILE STATION

RELATED APPLICATIONS

This application claims priority under 35 U.S.C. §119(e) from the following U.S. provisional application: Application Ser. No. 60/409,155 filed Sep. 9, 2002. That application is incorporated in its entirety by reference herein.

BACKGROUND OF THE INVENTION

The present invention generally relates to call handling in a communication network, and particularly relates to call handling for busy mobile stations where concurrent services are not supported.

Evolving wireless communication networks offer advanced packet data services along with legacy circuit-switched services. Packet data services include, for example, web browsing, streaming media, and email, while circuit-switched services include, for example, traditional low bit-rate voice and facsimile services usually associated with calls between subscribers on the Public Switched Telephone Network (PSTN) and subscribers operating in the wireless communication networks.

Several of the current wireless communication standards, such as the family of IS-2000 CDMA standards, include provisions for concurrent packet data and circuit-switched services. In a concurrent services environment where both the network and a particular mobile station support concurrent services, a user of the mobile station can send and receive voice calls while maintaining an active packet data connection with the network.

Despite such provisions in the standards, a great many existing wireless networks are not upgraded with concurrent services support, and a great many more existing mobile stations do not (and will not) support concurrent services. Lack of concurrent services support represents a challenge with regard to handling call termination and origination instances for busy mobile stations.

Broadly, mobile stations may be busy for a number of reasons. A mobile station may be busy in another voice call, busy in a packet data session, or busy in other non-voice calls that are not packet data calls in the strict sense. For example, a mobile station may be busy sending or receiving Position Location Determination (PLD) information, or busy sending or receiving Short Messaging Services (SMS) text or engaging in similar messaging activities. Where those services are allocated a dedicated traffic channel rather than an access channel, the mobile station is busy even though the mobile station user might not be aware of that condition.

Busy mobile stations pose potential service problems where concurrent service is not supported. In attempts to address the challenges presented in non-concurrent service scenarios, certain standards, such as the TIA-935 standard, define procedures for prioritizing circuit-switched calls over packet data calls. These procedures, referred to as Circuit-Switched Call Precedence Over CDMA Packet Data Session (CPOP), specify that if a (mobile station) user is engaged in a packet data call when an incoming voice call is received for that user, the network simply tears down the packet data connection and establishes a new connection for the incoming voice call. One additionally may refer to the IS-2001 Inter-Operability for cdma2000 Access Network Interfaces standard that details such a prioritization approach as it is being considered by the standardization bodies.

This brute force approach provides for delivery of the incoming voice call but includes the inelegant, at least from the users' perspective, step of simply dropping the data connection in favor of terminating the incoming voice call at the mobile station. Other types of communication networks, such as Wideband CDMA, may have similar call handling problems in non-concurrent service scenarios.

SUMMARY OF THE INVENTION

The present invention comprises a method and apparatus providing improved call handling in a wireless communication network for non-concurrent service scenarios. In general, the present invention sends an incoming voice call notification to mobile stations that are engaged in data calls. In one embodiment, such notification is sent to a mobile station using a traffic channel currently allocated to the data call and the incoming voice call is routed to voice mail or processed according to other desired call treatment. Thus, the network provides an immediate indication that that the mobile station user has just missed an incoming voice call but does so by using the mobile station's existing traffic channel in a manner that does not disrupt the data call. The call notification sent to the mobile station can include calling party information, e.g., caller ID. The mobile station can be configured to store the information for later retrieval by the user in returning the missed call.

In another exemplary embodiment, the network is configured to attempt delivery of the incoming voice call by reusing communication resources already allocated to the data call such that signaling overhead is reduced. In such an embodiment, the network can reconfigure the mobile station's existing traffic channel to support voice traffic, and add associated voice processing needed, and then use the reconfigured/renegotiated traffic channel for delivering the incoming voice call to the mobile station.

Such renegotiation can be keyed to whether the user of the mobile station wishes to receive the incoming voice call in favor of the current data call. Thus, the network can determine that the mobile station is engaged in a packet data call, and send a notification message to the mobile station via control signaling on the data call's traffic channel, causing the mobile station to prompt the user. If a return response is received from the mobile station, indicating that the voice call is desired, the network renegotiates the traffic channel and ends or suspends the packet data call.

On the other hand, the data call can be a circuit-switched data call, such as Position Location Determination, SMS, etc., that was not initiated by user—indeed the user may not be aware of the mobile station's busy condition. In such instances, the network simply renegotiates the traffic channel to support voice call delivery without prompting the user.

Thus, an exemplary method of call handling in a wireless communication network comprises receiving an incoming voice call for a mobile station that is busy in a data call, and sending an incoming call notification to the mobile station via signaling over an existing traffic channel allocated to the data call. The network can be configured to route the incoming voice call to voice mail in conjunction with sending the call notification to the mobile station, and can be configured to include calling party identification in the incoming call notification sent to the mobile station.

Further, if the network reconfigures a traffic channel from supporting a circuit-switched data call to supporting the incoming voice call, the network can, nonetheless, continue with the data call transaction via control signaling over the reconfigured traffic channel. That is, the network can continue with the data transaction by including associated signaling within the voice call traffic. In contrast, if the data call was a packet data call, the network ends or suspends the data transaction associated with the data call.

In one or more of its embodiments, the present invention can be implemented in networks and in mobile stations based on a variety of wireless communication network standards. Such standards include, but are not limited to, IS-2000 CDMA standards, and in other standards where non-concurrent services need to be reconciled for various busy-mobile call origination and termination scenarios.

DETAILED DESCRIPTION OF THE INVENTION

Several developing wireless network standards provide support for concurrent services wherein a given mobile station simultaneously has both voice and packet data connections to the wireless network. Generally, the circuit-switched voice call is supported by the allocation of a fundamental channel (FCH) to the mobile station, and the one or more packet data connections are supported by the allocation of one or more supplemental channel (SCH).

Concurrent services must be supported by the network and by the mobile station. Thus, in many practical instances, concurrent services are not available because of the many existing networks and mobile stations do not support it. Even where concurrent service is supported, it is not always possible or desirable to use concurrent service in certain call handling scenarios.

For example, contemporary definitions of concurrent service provide for the simultaneous assignment of one fundamental channel and one or more supplemental channels, which implicitly limits concurrent services to concurrent voice-plus-packet-data. That is, circuit-switched voice service requires the allocation of a fundamental channel, leaving only data-oriented supplemental channels available for concurrent assignment to the mobile station.

However, there are non-voice data calls that are considered circuit-switched services and thus require the allocation of a fundamental (traffic) channel. This means that a conventional mobile station engaged in a non-voice circuit switched data call is unavailable for concurrent delivery of an incoming voice call because of the inability to assign another fundamental channel to support the required voice connection. Examples of such non-voice data calls include calls associated with Position Location Determination (PLD), Short Message Service (SMS), Over-The-Air Service Provisioning and Parameter Administration (OTASP and OTAPA—see the TIA/EIA/IS-725-A standard). Another interesting characteristic of these types of non-voice data calls is that, oftentimes, a user of a mobile station busy in such services is unaware that his or her mobile station is engaged in a call with the network.

In general, the reader should understand that concurrent service may not be possible in certain scenarios, even if it is supported by the network and by the particular mobile station of interest. Where concurrent service is not supported or is not desirable, certain call handling dilemma are presented. For example, if a mobile station is busy in a packet data call, the network cannot deliver an incoming voice call to it without disrupting the packet data call. The earlier mentioned standard, IS-2001 Inter-Operability for cdma2000 Access Network Interfaces, gives priority to voice calls and thus specifies that the network will tear down an existing non-voice connection with a mobile station responsive to receiving an incoming (mobile terminated) voice call targeted to that mobile station.

Figure 1:
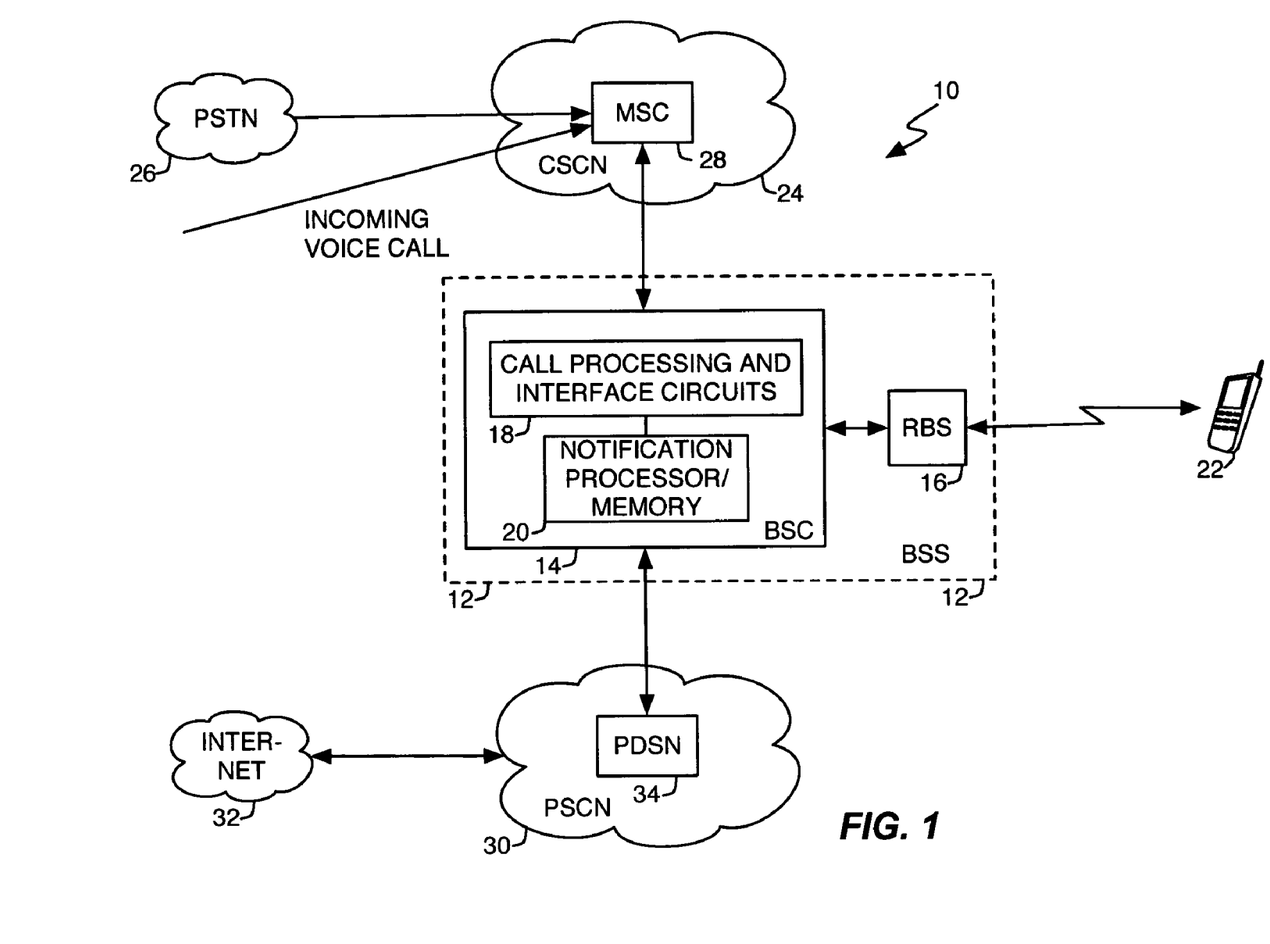
FIG. 1 is a diagram of an exemplary wireless communication network in which the present invention can be embodied.

The present invention provides improved call handling in that call scenario and in others where concurrent service is not possible or is not desired. FIG. 1 illustrates an exemplary wireless communication network 10 that is configured to provide improved call handling in non-concurrent service scenarios. Network 10 can be configured according to the IS-2000 family of standards, or according to other network standards as needed or desired. Those skilled in the art will appreciate that nomenclature for the illustrated network entities might vary according to the particular standard without departing from like functionality.

Network 10 comprises a Base Station (BS) 12 that includes a Base Station Controller (BSC) 14 and a Radio Base Station (RBS) 16. In practice, each BSC 14 supports one or more RBSs 16 and network 10 includes a plurality of BSs 12 to provide support over a desired service area or areas. Understanding the present invention does not, however, require the illustration of such details, and it should be understood that BS 12 could be configured differently without affecting the present invention.

An exemplary BSC 14 comprises call processing and interface circuits 18, e.g., circuit and packet switching circuits and associated signal routing and processing circuits (microprocessors, etc.), and a notification processor 20. Such processing circuits include, for example, voice encoders/decoders ("vocoders") that provide coding and decoding for over-the-air voice. Further, in an exemplary embodiment, the notification processor 20 comprises a microprocessor or other logic circuit that executes program instructions stored in a computer readable medium. Notification processor 20 can be implemented as a standalone microprocessor and memory subsystem within BSC 14, or it can be implemented using shared processing and memory resources.

BSC 14 communicates with and controls one or more mobile stations 22 through RBS 16. In turn, BSC 14 communicatively couples mobile station 22 to one or more external networks (and to other mobile stations 22 in network 10). For example, BSC 14 couples mobile station 22 through a Circuit Switched Core Network (CSCN) 24 to the Public Switched Telephone Network (PSTN) 26.

CSCN 24 comprises a Mobile Switching Center (MSC) 28 that provides circuit-switched incoming and outgoing call routing. MSC 28 includes call processing, switching, and interface circuits, and couples to the BSC 14 through a defined signaling/data interface (see, e.g., IS-2001 standard) that permits the MSC 28 and BSC 14 to provide inter-entity signaling to each other, as well as carry data between them. CSCN 24 can include additional entities that are not shown for the sake of brevity, such as Home Location Registers (HLRs), Visitor Location Registers (VLRs), etc.

Providing further flexibility, BSC 14 couples mobile station 22 through a Packet Switched Core Network (PSCN) 30 to the Internet 32, or to other Public Data Networks (PDNs), private packet networks, etc., as needed or desired. PSCN 30 includes a Packet Data Serving Node (PDSN) 34 to support packet data communications, and may include other entities as needed or desired. The call processing and interface circuits 18 of BSC 14 can include a Packet Control Function (PCF) that provides the Radio-Packet (RP) interface between communications being routed between BSC 14 and the PSCN 30. BSC 14 can be configured to communicate with a separate PCF via A8/A9 interfaces as specified in IS-2001.

Thus, network 10 provides voice and other circuit-switched call support for mobile station 22 and additionally provides packet-switched call support for mobile station 22. In this discussion, the term "call" is given broad scope and includes both data and non-data connections to network 10. Thus, unless specified otherwise, the term call means that the mobile station 22 is engaged in some type of connection with the network, be it circuit-switched voice, circuit-switched non-voice, packet data, or other.

Assuming that concurrent service is not supported either by the network or by the mobile station, or assuming that concurrent service in a specific call instance is not desired or is not possible, network 10 can be configured to execute program logic that implements the improved call handling of one or more exemplary embodiments of the present invention. Such processing logic can, for example, be implemented in MSC 28, or in BSC 14, or in a combination of MSC 28 and BSC 14 based on inter-entity signaling. Additionally, as will be explained later, mobile station 22 can be configured with processing logic according to one or more embodiments of the present invention.

Figure 2A:
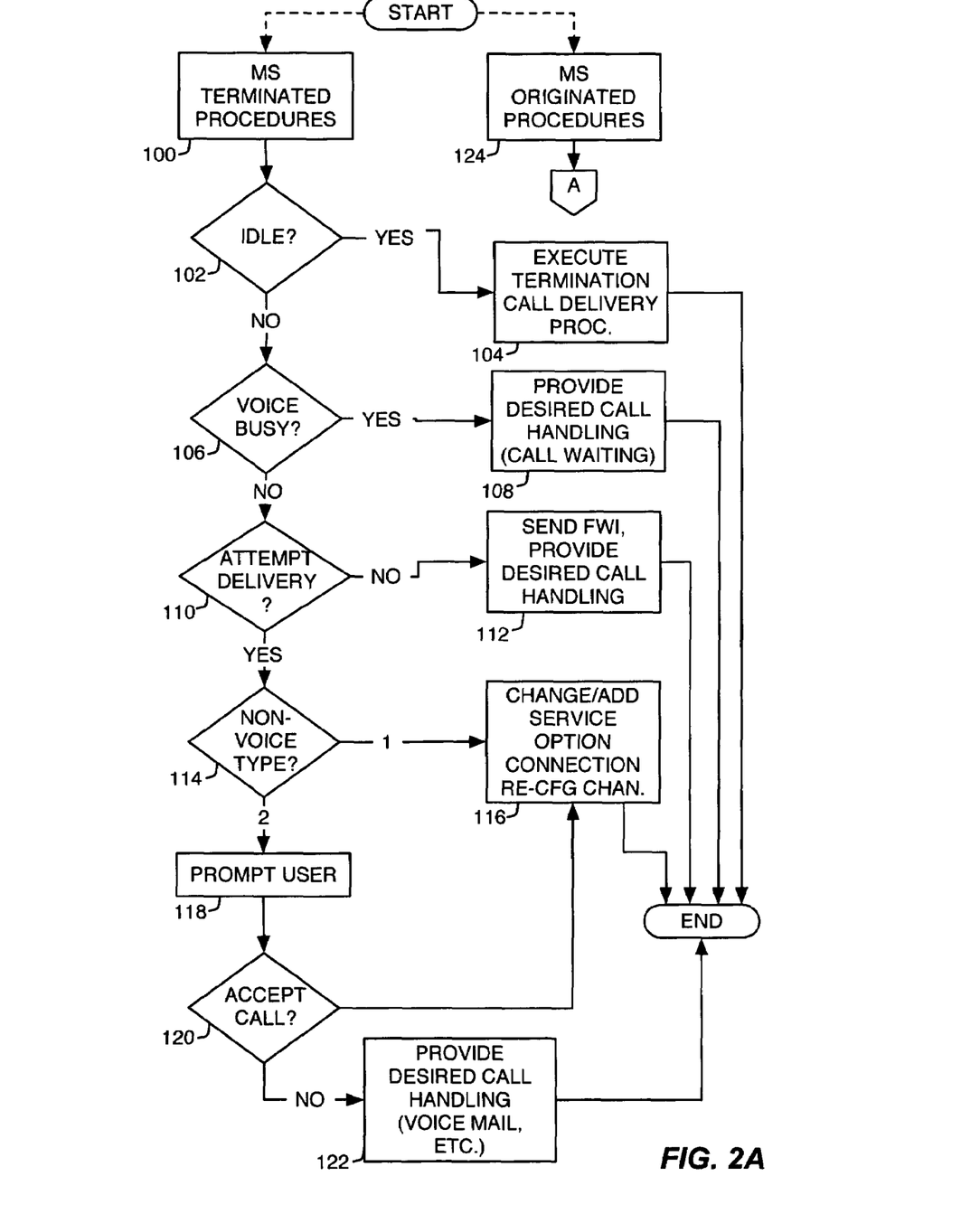
FIGS. 2A and 2B are diagrams of processing logic for an exemplary embodiment of the present invention.
Figure 2B:
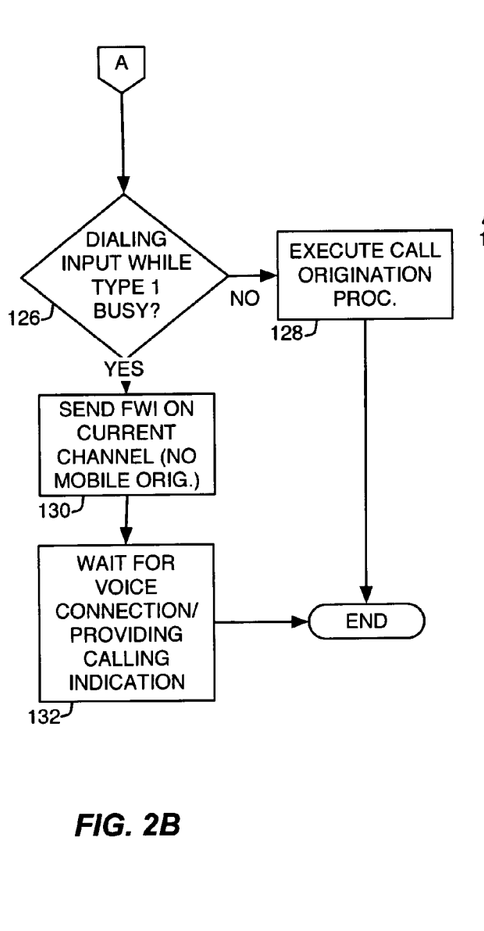

FIGS. 2A and 2B illustrates exemplary program logic and method according to one embodiment of the present invention. FIG. 2A details exemplary mobile-terminated call handling from the network's perspective and FIG. 2B details mobile-originated call handling from the mobile terminal's perspective.

Mobile-terminated call handling processing begins in response to MSC 28 receiving an incoming voice call for mobile station 22 (Step 100). If the mobile station 22 is idle (Step 102), network 10 executes call delivery processing wherein it attempts to terminate the call to mobile station 22 (Step 104).

MSC 28 can determine whether mobile station 22 is busy by inspecting the associated VLR information or other data. If mobile station 22 is busy in a voice call, MSC 28 provides call handling as desired (Step 108). For example, the subscriber profile associated with mobile station 22 might indicate that a call waiting feature is enabled. If so, call waiting procedures can be executed. Otherwise, the call can be delivered to voice mail, a busy or unavailable indicator can be returned to the calling party, etc.

If the mobile station 22 is busy in a non-voice call, MSC 28 must determine whether to attempt call delivery (Step 110). Note that this operation might not be an explicit program logic operation—for example, MSC 28 can be configured always to attempt call delivery to non-voice busy mobile stations, or to make such attempt selectively based on provisioning data that identifies whether BSC 14 is configured to support such a delivery attempt, or based on receiving an indication from BSC 14 that it is so configured.

If no call delivery is to be attempted, MSC 28 simply can generate a Flash-With-Information (FWI) message or the like to BSC 14 for delivery to the mobile station 22 via signaling on the mobile station's currently allocated traffic channel (Step 112). The message can include, for example, caller identification information, or can simply provide an alert to the mobile station 22 that an incoming call was just missed. Meanwhile, network 10 can provide whatever call treatment is desired for the incoming call. That is, MSC 28 can route the incoming call to voice mail, or it can return a busy indication to the calling party and drop the call (Step 112).

Thus, in the embodiment where call delivery is not attempted to the mobile station 22 when it is in a non-voice call, the user is nonetheless given a real-time alert that a party is attempting to call his or her mobile station. As noted, the alert message sent from the network 10 can include calling party information, and that data can be stored by the mobile station 22 for use in placing a return call. This would again allow the user to realize that someone is attempting to reach and free up his phone in case the caller tries again.

With this embodiment of the present invention, the mobile station user can remain engaged in a non-voice call, e.g., a packet data call, and still be alerted to incoming voice calls. In contrast to the conventional approach, where the user either remains unaware of such calls, or such calls result in the data call being torn down, this embodiment of the present invention provides immediate call notification and permits the user to decide whether and when to return a missed voice call.

In another embodiment, network 10 is configured to attempt delivery of the incoming voice call (Step 110). In that case, network 10 can be configured to determine the nature of the non-voice call that mobile station 22 currently is engaged in. If mobile station 22 is engaged in a PLD, SMS, OTAPA, or other circuit-switched data call, it is likely that the user is unaware of the mobile station's busy status. These types of non-voice services are referred to herein as "Type 1" data services. In contrast, "Type 2" data services are packet data services such as web browsing, voice mail, streaming media, etc., wherein the user almost certainly is aware that he or she is connected to the network 10.

How call delivery is attempted depends on whether the mobile station 22 is busy in a Type 1 or a Type 2 data call. BSC 14 can determine the call type by inspecting the Service Option (SO) connection of the mobile station 22, for example. If BSC 14 determines that the mobile station 22 is engaged in a Type 1 data call (Step 114), it reconfigures the mobile station's SO connection to support delivery of the voice call to the mobile station 22 (Step 116). BSC 14 adds vocoding resources as needed and signals MSC 28 to establish a data connection between them to carry the voice call traffic. Once the voice call is setup, BSC 14 alerts mobile station 22.

This all is explained in greater detail later herein but one should note that these operations permit the network 10 and the mobile station 22 to retain some or all of the communication resources, including traffic channels, that were allocated for the Type 1 data call for use in the voice call, thereby providing significant reductions in signaling. That is, rather than tear down the mobile station's current connection, that connection is reused, with reconfiguration as needed, to support the incoming voice call.

Additionally, reconfiguring the mobile station's service connection from data to voice and keeping (reusing) the existing traffic channel reduces call setup (no paging or channel assignment needed), and leads to increased call setup reliability and security. These latter benefits accrue because, with the present invention, the signaling messages associated with call notification and call delivery occur over the mobile station's existing dedicated traffic channel, which is a reliable and, possibly, secure, communication link. In a conventional network, such signaling occurs over common paging/access channels, which are shared and not power controlled, and which are more prone to message collisions/failures on the air interface.

In another advantage, network 10 can, in many instances, continue the operations that were being supported by the data call using, for example, blank-and-burst or dim-and-burst signaling over the same traffic channel as being used to carry the voice call. That is, although the existing traffic channel is changed over to voice service, the network 10 can be configured, where appropriate, to continue the prior data transaction over the voice channel.

Returning to the logic flow, if the mobile station 22 is busy in a Type 2 data call (Step 114) then most likely the user has initiated the connection to network 10, or at least is aware of it. In that case, it is appropriate to signal the mobile station 22 to prompt its user as to whether acceptance of the incoming voice call is desired (Step 120). If a negative response is received or no response is received, call delivery is not attempted, the ongoing Type 2 data call is left undisturbed, and desired call treatment is applied to the incoming voice call (Step 122). For example, the voice call can be routed to voice mail or a busy indicator can be returned to the calling party. If a positive response is received, e.g., the mobile station 22 timely returns a response message, the mobile station's service connection is reconfigured for voice service and the mobile station 22 is alerted when the voice call is setup (Step 116).

In contrast to the above network-based processing logic, FIG. 2A additionally illustrates an exemplary processing method that can be implemented in the mobile station 22 to handle mobile-originated call processing (Step 124). Here, it is assumed that a user of the mobile station 22 has attempted to originate a voice call while the mobile station is busy. Practically, this means that mobile station 22 was busy in a Type 1 data call that the user was unaware, i.e., it is assumed that the user will not simply begin dialing an outgoing number if the mobile station is engaged in Type 2 data call, e.g., web browsing, etc., or if it already is engaged in a voice call.

Thus, continuing with FIG. 2B, the mobile station 22 receives dialing input (e.g., digits plus the "send" command) from its user and determines whether it is busy in a Type 1 data call (Step 126). If not (and assuming that it is otherwise idle), mobile station 22 executes call origination as would a conventional mobile terminal (Step 128). However, if mobile station 22 recognizes that it is busy in a Type 1 data call, it sends the dialing information as a FWI message or the like on the traffic channel currently allocated to its ongoing data call (Step 130).

That is, the mobile station's processing logic is configured not to tear down the existing connection and execute a conventional call origination but rather to send the dialing information as signaling information on its currently allocated traffic channel and then wait for the network 10 to establish the voice connection using that existing channel (Step 132). Of course, mobile station 22 can be configured to provide the user with a dialing indication that is the same as or similar to what it would provide during conventional (normal) call origination, such that dialing out while busy in the data call appears like a conventional dialing process from the user's perspective. That is, mobile station 22 can be configured to provide its user with the same or similar call dialing indications as it would had the user dialed out when the mobile station 22 was idle and a conventional mobile-originated call was initiated.

Figures 3A, 3B:
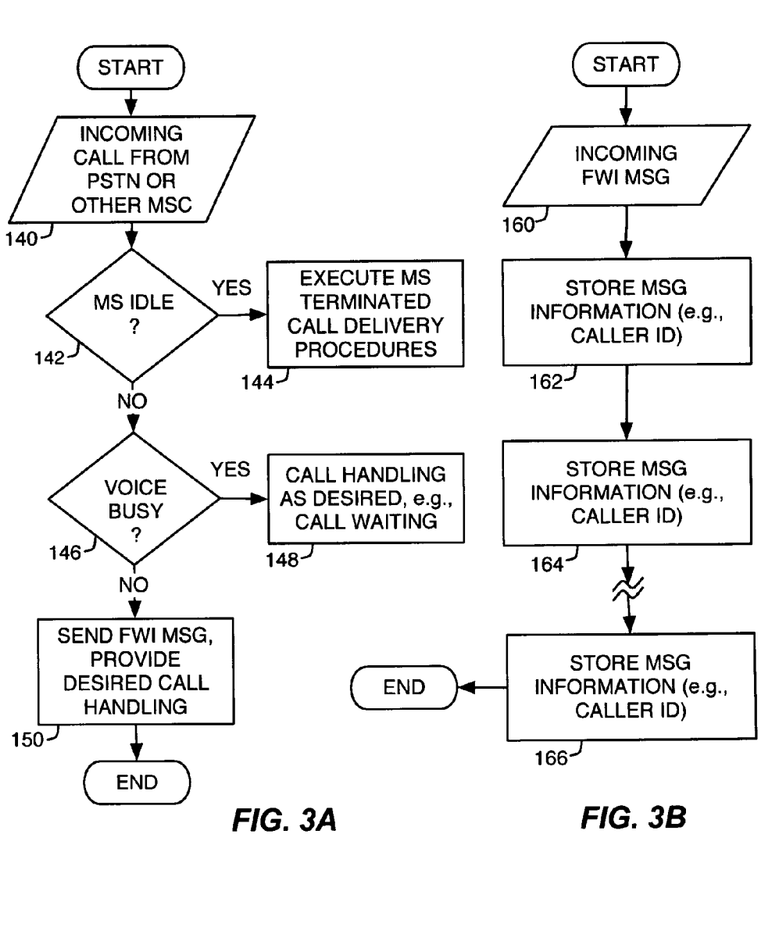
FIGS. 3A and 3B are diagrams of processing logic associated with call notification delivery to a busy mobile station according to one embodiment of the present invention.

Turning to FIGS. 3A and 3B, one sees an illustration of exemplary processing logic at the MSC 28 and at the mobile station 22, respectively, supporting the no-call-delivery-attempt logic introduced in FIG. 2A at Step 112. As noted, the no-delivery processing option can be configure via appropriate provisioning information at MSC 28 or elsewhere in network 10, or can be dynamically selected by MSC 28. In either case, FIG. 3A illustrates logic that can be implemented in hardware, software, or some combination thereof, at MSC 28.

Processing begins with MSC 28 receiving an incoming voice call for mobile station 22 (Step 140) and determining whether the mobile station 22 is idle (Step 142). As noted, MSC 28 can be configured to make the busy/non-busy determination by examining the VLR record. If the mobile station 22 is idle, conventional call delivery is attempted (Step 144). If, however, mobile station 22 is not idle but rather is voice busy (Step 146), MSC 28 provides call handling as desired (Step 148). As noted, such call handling can comprise voice mail delivery, call waiting delivery, or simply comprise returning a busy indicator to the calling party. Which treatment is provided can depend on subscriber profile information, provisioning defaults, etc.

If the mobile station 22 is non-voice busy (Type 1 or 2 data call), MSC 28 sends a FWI message to BSC 14, preferably including calling party identification information, and provides desired call handling, e.g., voice mail, busy, etc. (Step 150). Note that BSC 14 delivers the FWI message to mobile station 22 via control signaling on the mobile station's currently allocated traffic channel.

FIG. 3B illustrates the corresponding mobile station logic. Mobile station 22 receives the incoming FWI via control signaling on its currently allocated traffic channel (Step 160). Mobile station 22 can be configured to store the notification message information (Step 162) and alert the user (text display, audio, etc.) and continue with its current data call (Step 164). Later, at the user's discretion, the stored information can be used by mobile station 22 in originating an outgoing call to the earlier calling party (Step 166).

Figure 4:
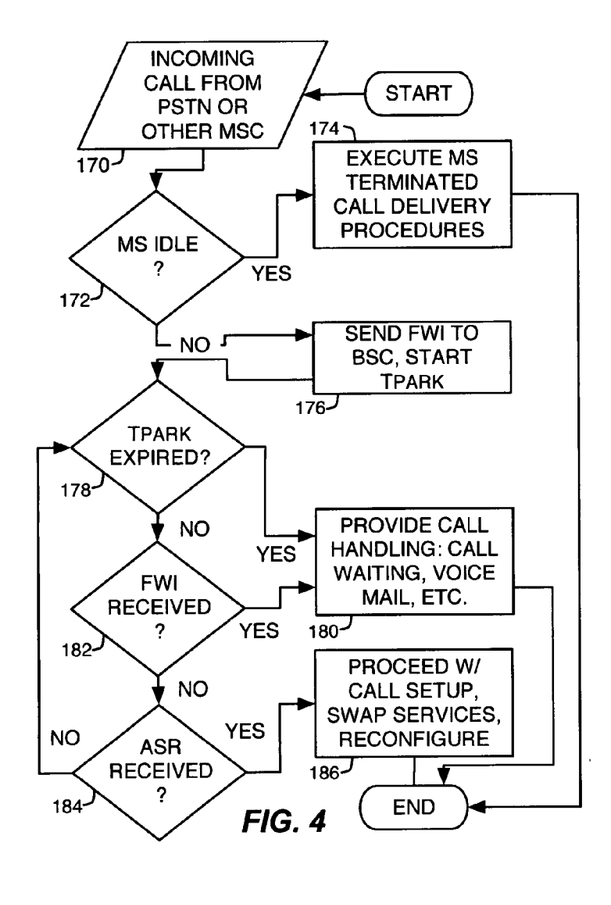
FIGS. 4 and 5 are diagrams of exemplary Mobile Switching Center and Base Station processing logic associated with exemplary call notification and optional voice call delivery according to another embodiment of the present invention.
Figure 5:
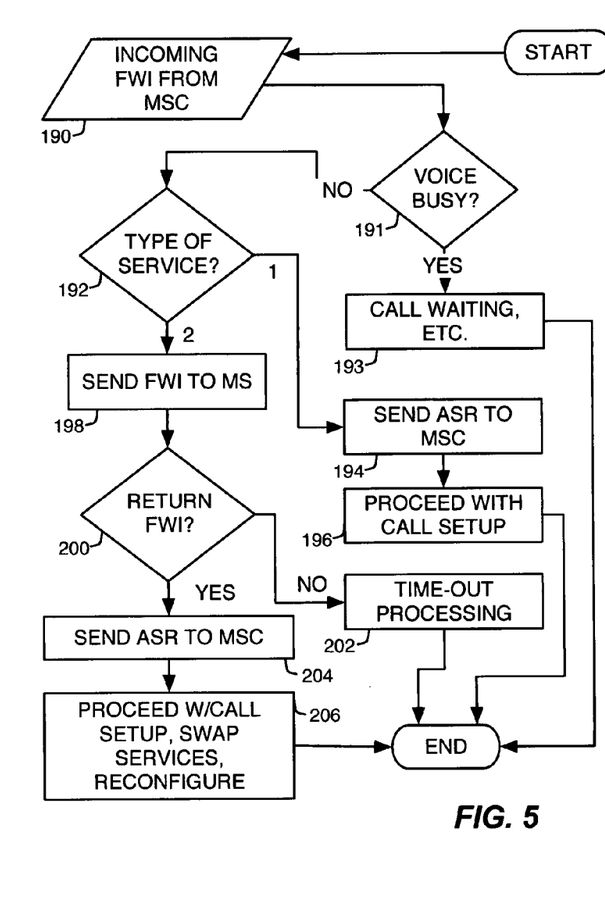

While FIGS. 3A and 3B illustrated exemplary non-delivery logic, FIGS. 4 and 5 illustrate exemplary processing logic for MSC 28 and BSC 14, respectively, in configurations where call delivery is attempted to mobile station 22. In FIG. 4, processing begins with the MSC 28 receiving an incoming voice call from the PSTN, from another MSC, etc. (Step 170).

MSC 28 determines whether the mobile station is idle (Step 172). It can make that determination by, for example, an examination of the VLR record. If the mobile station is idle, MSC 28 undertakes mobile-terminated call delivery procedures (Step 174). If the mobile station is busy, e.g., on a traffic channel (not idle), MSC 28 sends a FWI message to BSC 14 to initiate incoming call notification and attempted delivery (Step 176). Coincident with this, MSC 28 "parks" the incoming voice call and starts an internal timer, TPARK, that it uses to time-out the call delivery attempt while waiting for return signaling from BSC 14. During call parking, MSC 28 can be configured to provide a ringing or other indication to the calling party.

If TPARK expires before return signaling from BSC 14 (Step 178), MSC 28 provides desired call handling for the incoming call, e.g., voice mail, etc. (Step 180). On the other hand, if a FWI message is returned by BSC 14 before expiration of TPARK (Step 182), this is an indication that the mobile station was voice busy and thus MSC 28 executes call waiting, call conferencing, or other processing as indicated by subscriber profile or provisioning information (Step 180).

Thus, where call delivery is to be attempted, MSC 28 sends a FWI message to BSC 14 to trigger call notification to the mobile station 22. If the mobile station 22 already is in a voice call, MSC 28 receives an appropriate FWI return message from the BSC 14. However, if the mobile station is non-voice busy (Type 1 or 2 data call), MSC 28 receives an Additional Services Request (ASR) message back from BSC 14 rather than a return FWI message (Step 184). The return ASR message is required because the mobile station's existing SO connection is non-voice and must be changed or reconfigured to reuse the mobile station's existing traffic channel for the incoming voice call. Thus, the ASR message serves the twofold purpose of alerting MSC 28 to continue with the voice call delivery attempt and to add/reconfigure call resources as needed to support changing over the current data connection to voice service.

If an ASR message is received, MSC 28 proceeds with call setup and service swapping/reconfiguration as needed to reuse the communication resources assigned to the mobile station's existing data call (Step 186). To do so, MSC 28 sets up a voice connection between it and BSC 14 and triggers vocoder assignment and SO connection at BSC 14 by sending an Assignment Request (AR) message to BSC 14. In response, BSC 14 establishes a new SO connection for mobile station 22 to support the voice call. Once BSC 14 renegotiates the traffic channel, it returns an Assignment Complete (AC) message to MSC 28 to indicate that mobile station 22 is ready for the voice call. (Note that BSC 14 can provide an alert, e.g., ringing, to mobile station 22.)

When the mobile station user answers the voice call, mobile station 22 returns a connect order to BSC 14, and BSC 14 in turn sends a connect message to MSC 28 indicating that mobile station 22 has answered the call. At this point, mobile station 22 is on the voice call with the calling party. The disposition of the mobile station's prior data call depends on its type and is explained in the detailed presentation of exemplary BSC processing immediately below.

After call delivery, MSC 28 updates the "call state" of mobile station 22 to record the fact that the mobile station 22 is now in voice service. For example, MSC 28 can be configured to update the VLR record. Updating the call state ensures that a subsequent incoming voice call while the mobile station 22 is still voice busy can be properly handled by MSC 28 according to call waiting or other voice-oriented call handling.

FIG. 5 illustrates exemplary BSC processing supporting attempted voice call delivery when mobile station 22 is busy. BSC 14 receives a FWI message from MSC 28 as an incoming call indication (Step 190). BSC 14 determines whether mobile station 22 is busy in a voice call (Step 191) and, if so, processing proceeds with call waiting procedures or other exemplary voice busy call treatment (Step 193). With call waiting, BSC 14 would simply forward the FWI message to mobile station 22, and relay any return response to the MSC 28 for call handling.

If, however, the mobile station is not voice busy but rather is busy in a data call, BSC 14 determines whether mobile station 22 is engaged in a Type 1 or Type 2 data call (circuit-switched data versus packet data) (Step 192). If the mobile station is engaged in a Type 1 data call, there is no need to alert the mobile station user before attempting call delivery, since the user likely is unaware of the busy condition. Therefore, BSC 14 does not send a FWI message to mobile station 22 but rather immediately sends an ASR message to MSC 28 to proceed with call setup, such as setting up a BSC-MSC connection for voice bearer transport, setting up PSTN connections as needed, etc.

BSC 14 also reconfigures the mobile station's service option by, for example, adding vocoder resources to support voice processing and renegotiating the existing traffic channel for voice call use to support mobile termination of the voice call (Step 194). Note that because the ASR message is generated by the BSC 14 without mobile origination or paging input from mobile station 22, BSC 14 can be configured to request default voice service options, e.g., EVRC, 8K or 13K vocoding. Such defaults can be renegotiated after the voice call is connected. Alternatively, MSC 28 can propose the service option to be used in its return assignment request based on, for example, subscriber profile or other information.

Regardless, BSC 14 proceeds with call setup after sending the ASR message by waiting for a corresponding AR message back from the MSC 28. Upon receipt of that return message, BSC 14 renegotiates the channel as needed and can provide an alert indication to the mobile station 22 so that it can provide its user with an incoming call indication, e.g., ringing or other indicator (Step 196).

Service negotiation between the BSC 14 and the mobile station establishes a Service Configuration for supporting the incoming voice call. The Service Configuration identifies parameters and attributes used by the mobile station 22 and the BSC 14 that enables each of them to interpret the traffic channel frames.

Once the voice call is connected on the mobile station's existing traffic channel, network 10 can continue with the transaction being conducted in the prior Type data call. For example, if the mobile station 22 was engaged in a PLD or SMS transaction when the voice call came in, data associated with that transaction can continue via control signaling on the reconfigured traffic channel. In this manner, then, network 10 can be configured to complete the prior data call transaction by mixing control signaling in with voice traffic. As noted, such control signaling can be by blank-and-burst or dim-and-burst signaling on the traffic channel.

Rather than Type 1 data service, if the mobile station 22 is busy in a Type 2 data call (Step 192), then it is appropriate to notify the mobile station user as to the presence of the incoming voice call but leave it to the user's discretion as to whether the data call will be interrupted in favor of receiving the voice call. Thus, where BSC 14 detects that mobile station 22 is busy in a Type 2 data call, it sends an FWI message to mobile station 22 (Step 198) indicating that a return response should be provided as indication of the user's desire to receive the incoming voice call. BSC 14 can run one or more timers while waiting for the mobile station's return response (Step 200), and the failure to timely receive such response is taken as an indication that call delivery is not desired. Thus, BSC 14 can timeout its call delivery attempt (Step 202), which allows the earlier described TPARK timer in MSC 28 to expire, leading to the voice call being dropped, routed to voice mail, or other as desired.

If, however, BSC 14 receives a timely FWI message in return from mobile station 22, it takes that as an indication that the call delivery attempt should proceed. Thus, BSC 14 sends an appropriately configured ASR message to MSC 28 and proceeds with reconfiguration, etc., as described above—see Steps 194 and 196.

However, note that unlike a Type 1 data call, a Type 2 data call cannot be continued on the current traffic channel once it has been reconfigured for use in the voice call. Therefore, BSC 14 can be configured to signal the PCF as to whether the now-interrupted packet data call should be placed in dormancy or released. That is, the mobile station's packet data session can be preserved for a time in case the user wishes to resume the packet data call after ending the voice call. Dormancy or release can be signaled via the BSC's A8/A9 interface to the PCF.

Further, note that even where network 10 is configured to attempt voice call delivery to mobile stations busy in non-voice calls, provisioning or other data, e.g., subscriber profiles, can be used to control such attempts. For example, the network 10 can be configured such that a mobile station user can dynamically select whether call delivery is to be attempted. In that manner, voice call delivery could be disabled for a data call of particular importance to the user, or for a period of time (hours, days, etc.) and then re-enabled by the user. Alternatively, the mobile station 22 can be configured to include processing logic to enable or disable call delivery attempts, such as by ignoring call delivery attempt message from network 10.

Figure 6:
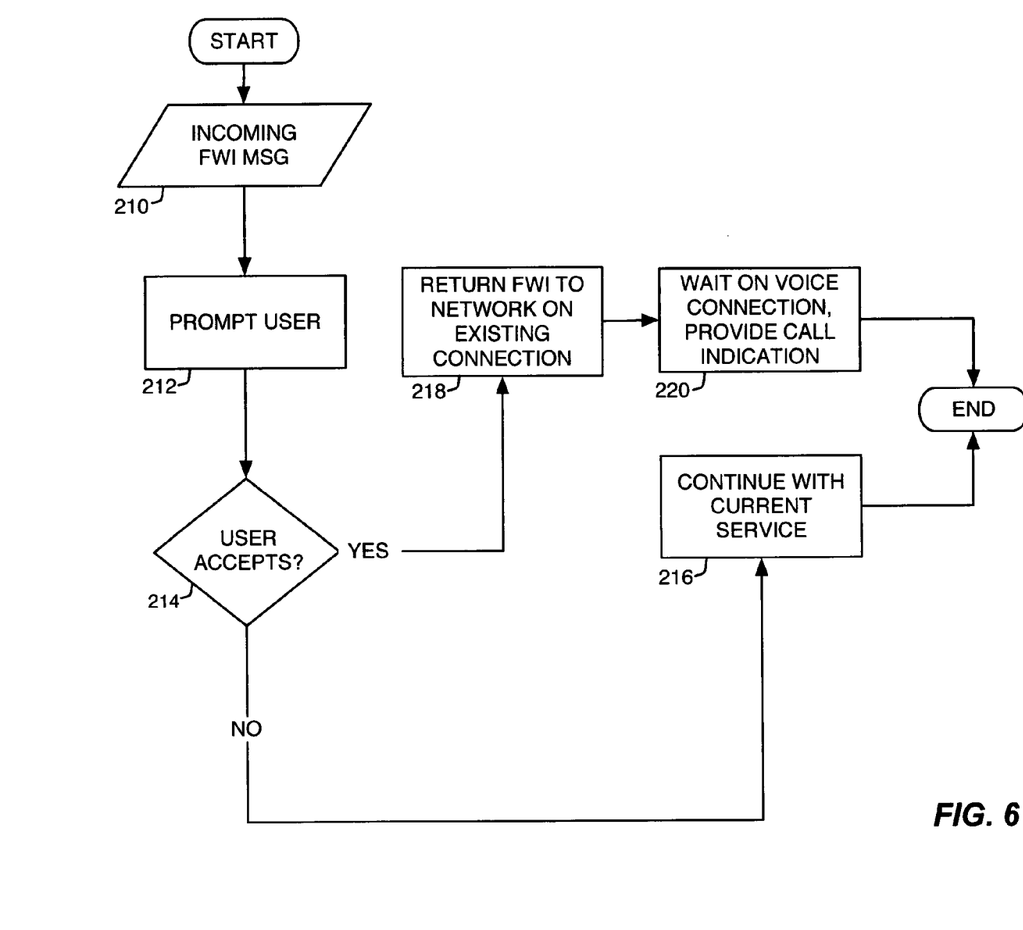
FIG. 6 is a diagram of exemplary mobile station processing logic according to one or more embodiments of the present invention.

Complementing the above exemplary MSC/BSC program logic, FIG. 6 illustrates exemplary mobile station processing logic in support of such call-delivery-attempt methods. While FIG. 6 illustrates user-prompt based call delivery, it should be noted that if the mobile station 22 is busy in a non-voice data service such as PLD or SMS, i.e., a non-voice circuit-switched data service, then the MSC's FWI call notification message sent to BSC 14 is not forwarded by BSC 14 to mobile station 22 so that the user is not prompted regarding voice call delivery.

Rather, as explained, BSC 14 requests voice service from the MSC 28 and reconfigures the mobile station's service connection for voice service, including performing service renegotiation with the mobile station 22. That is, BSC 14 and the mobile station 22 signal each other as needed to renegotiate the traffic channel for use in supporting the voice call. Then, when BSC 14 alerts mobile station 22 that the voice call is setup, mobile station 22 answers the voice call by sending a connect order or the like to BSC 14.

As FIG. 6 illustrates, exemplary processing can be different where the mobile station is engaged in a packet data call because the mobile station user might want to retain the data call rather than receive the incoming voice call. Thus, in an exemplary packet data busy scenario, BSC 14 attempts to determine whether the mobile station user wishes to receive the incoming voice call by sending a call notification to the mobile station 22, e.g., by sending a FWI message to mobile station 22 responsive to receiving the FWI message from MSC 28.

Thus, processing begins assuming that mobile station 22 is busy in a packet data call and receives a FWI message from BSC 14 (Step 210). In response to receiving the FWI message, mobile station 22 prompts the user to indicate whether reception of the voice call is desired (Step 212). If the user does not accept (Step 214), mobile station 22 continues with the current data service (Step 216). Note that network 10 can timeout the call delivery attempt based on not receiving a return response from the mobile station 22.

If the user accepts, mobile station 22 returns a FWI message to BSC 14 (Step 218) and proceeds with renegotiation and call acceptance as explained earlier herein (Step 220). As part of that processing, the mobile station 22 and BSC 14 renegotiate the service connection to reuse the existing dedicated traffic channel for the voice call, and then the mobile station 22 waits on an alert message from the BSC 14 indicating that the voice call is setup. That alert can be used to trigger a ringing indicator or other alert to the user of mobile station 22.

In prompting the user, mobile station 22 can be configured to provide an audible prompt, a visible prompt, or both, to alert the user regarding the incoming voice call. For example, mobile station 22 can beep, can display a text message, can vibrate, or perform any combination of alert functions. If calling party identification information was included in the incoming FWI message, mobile station 22 can display that information to the user.

Figure 7:
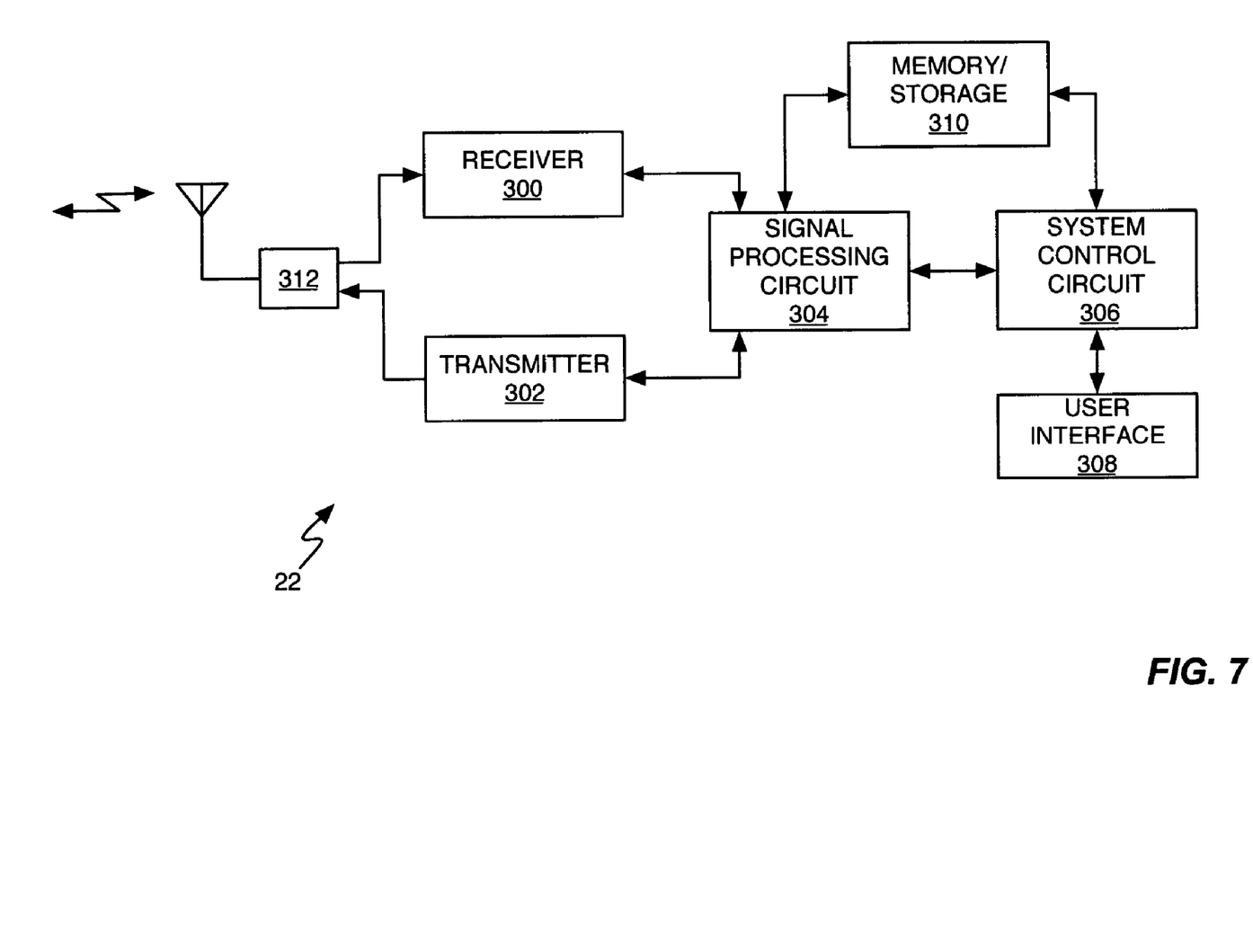
FIG. 7 is a diagram of an exemplary mobile station that is configured to support one or more embodiments of the present invention.

FIG. 7 illustrates an exemplary mobile station 22 that can be configured to support the present invention in any of its embodiments. Mobile station 22 comprises a receiver circuit 300, a transmitter circuit 302, a signal processing circuit 304, a system control circuit 306, user interface circuits 308, memory/storage devices 310, and an antenna assembly 312, including a duplexer/switch and transmit/receive antenna.

Signal processing circuit comprises one or more signal processors, e.g., DSPs, ASICs, FPGAs, etc., that provide receive and transmit signal processing functions, such as encoding/decoding, error detection, etc. Note that some circuit elements in the receiver and transmitter circuits 300 and 302 can overlap with or be integrated with the signal processing circuits 304.

System control circuit 306 comprises a microprocessor or other logic circuit, and can be integrated with the processing circuits of circuit 304. System control circuit 306 provides overall device control processing and manages the user interface 308, which can comprise display screens, keypads, microphones, loudspeakers, etc.

Memory/storage devices 310 comprise one or more memory circuits that individually or in shared fashion provide program instruction and data storage for the processing and control circuits 304 and 306. Note that these memory circuits can be integrated within the processing circuits themselves.

Regardless, exemplary embodiments of mobile station processing logic can be embodied as a computer program comprising stored instructions in memory/storage devices 310 that, in this context, serve as a computer readable medium for storing such instructions. Of course, those skilled in the art will appreciate that like functionality can be provided in hardware-based logic circuits, or in a mix of hardware and software. Further, those skilled in the art should appreciate that as used herein the term mobile station broadly refers to a range of wireless communication devices, including, but not limited to, cellular radiotelephones.

Further, it should be understood that the exemplary call handling methods discussed herein and illustrated in the accompanying figures can be implemented in hardware, software, some combination thereof. In one exemplary embodiment, BSC 14 includes one or more microprocessors and supporting circuits (e.g., memory, interface, etc.) that implement exemplary voice call notification and delivery methods based on executing program instructions comprising a computer program stored in a computer readable medium. Likewise, in an exemplary embodiment, MSC 28 comprises one or more microprocessor-based circuits or like processing logic, including supporting memory devices, to execute stored program instructions that implement exemplary voice call notification and processing in accordance with one or more embodiments of the present invention.

However, it should be understood that such details can be varied according to needs or desires. Indeed, the present invention is not limited these or any of the foregoing exemplary details but rather is limited only by the following claims and their reasonable equivalents.

What is claimed is:

1. A method of call handling in a wireless communication network comprising:
   receiving an incoming voice call for a mobile station that is busy in a packet-switched data call;
   sending an incoming call notification to the mobile station via signaling over an existing traffic channel allocated to the data call; and reconfiguring the existing traffic channel to support the incoming voice call and delivering the incoming voice call to the mobile station via the reconfigured existing traffic channel.

2. The method of claim 1, further comprising suspending or ending a data transaction associated with the data call.

3. The method of claim 1, wherein reconfiguring the existing traffic channel for use delivering the incoming voice call to the mobile station comprises establishing a new service option connection at a network Base Station (BS), and requesting a network Mobile Switching Center (MSC) to establish a voice connection for the incoming voice call.

4. The method of claim 3, further comprising requiring a return indication from the mobile station that indicates call delivery is desired before renegotiating the existing traffic channel.

5. A method of call handling in a wireless communication network comprising:
 receiving an incoming voice call indication at a Base Station (BS) that is targeted to a mobile station busy in a packet-switched data call; and
 sending a call notification message to the mobile station and, responsive to receiving a return acknowledgment from the mobile station, reconfiguring the service connection of the mobile station to deliver the incoming voice call using the existing traffic channel.

6. The method of claim 5, further comprising releasing a packet data service associated with the packet-switched data call.

7. The method of claim 5, wherein reconfiguring a service connection of the mobile station to deliver the incoming voice call using an existing traffic channel previously allocated to the data call comprises:
 sending a voice service call setup request to a Mobile Switching Center (MSC);
 receiving a voice circuit assignment from the MSC;
 establishing a voice service option connection at the BS to support the incoming voice call; and
 alerting the mobile station to inform the mobile station that the incoming voice call is setup.

8. The method of claim 7, wherein sending a voice service call setup request message to a Mobile Switching Center (MSC) comprises generating default voice service parameters at the BS rather than receiving requested voice service parameters from the mobile station.

9. A Base Station (BS) to provide a call handling in a wireless communication network, the BS comprising:
 call processing and interface circuits configured to provide voice and data call handling for a plurality of mobile stations; and
 a notification processor configured to:
  receive an incoming voice call indication at a Base Station (BS) that is targeted to a mobile station busy in a packet-switched data call; and
  send a call notification message to the mobile station and, responsive to receiving a return acknowledgment from the mobile station, reconfigure the service connection of the mobile station to deliver the incoming voice call using the existing traffic channel.

10. The BS of claim 9, wherein the BS is configured to suspend a packet data service associated with the data call after connecting the incoming voice call.

11. The BS of claim 9, wherein the BS is configured to release a packet data service associated with the data call after connecting the incoming voice call.

12. The BS of claim 9, wherein the BS reconfigures a service connection of the mobile station to deliver the incoming voice call using an existing traffic channel previously allocated to the data call based on:
 sending a voice service call setup request to a Mobile Switching Center (MSC);
 receiving a voice circuit assignment from the MSC;
 establishing a voice service option connection at the BS to support the incoming voice call; and
 alerting the mobile station to inform the mobile station that the incoming voice call is setup.

13. The BS of claim 12, wherein the BS is configured to send the voice service call setup request message to a Mobile Switching Center (MSC) as an additional services request message that includes default voice service parameters generated by the BS rather than by receiving requested voice service parameters from the mobile station.

14. A method of call handling in a mobile station for use in a wireless communication network, the method comprising:
 carrying on a packet-switched data call over an existing traffic channel; and
 renegotiating the existing traffic channel for circuit-switched voice call use responsive to signaling from the network, said renegotiating including receiving a call notification from the network via signaling on the existing traffic channel indicating that an incoming circuit-switched voice call is pending for the mobile station, returning a notification response to the network via signaling on the existing traffic channel based on prompting a user of the mobile station as to whether receipt of the incoming circuit-switched voice call is desired, sending and receiving signaling as needed to and from the network via the existing traffic channel to reconfigure it for circuit-switched voice use, and receiving an alert message from the network via signaling on the existing traffic channel indicating that the incoming circuit-switched voice call is set up and returning a call connect order to the network via signaling on the existing traffic channel; and
 changing from carrying on the packet-switched data call to carrying on the circuit-switched voice call over the existing traffic channel.

* * * * *

UNITED STATES PATENT AND TRADEMARK OFFICE
CERTIFICATE OF CORRECTION

PATENT NO. : 7,616,944 B2  Page 1 of 1
APPLICATION NO. : 10/657446
DATED : November 10, 2009
INVENTOR(S) : Gustavsson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1706 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

PATENT NO.         : 7,616,944 B2                                              Page 1 of 3
APPLICATION NO.    : 10/657446
DATED              : November 10, 2009
INVENTOR(S)        : Gustavsson et al.

It is certified that error appears in the above-identified patent and that said Letters Patent is hereby corrected as shown below:

The title page showing the illustrative figure should be deleted to be replaced with the attached title page.

On the title page, item (58), under "Field of Classification Search", in Column 1, Line 2, delete "-2,".

On title page 2, item (56), under "Foreign Patent Documents", in Column 2, Line 2, delete "WO 985115" and insert -- WO 9851115 --, therefor.

In the drawing sheet, consisting of Fig. 1, should be deleted to be replaced with the drawing sheet, consisting of Fig. 1, as shown on the attached pages.

Signed and Sealed this
Nineteenth Day of June, 2012

David J. Kappos
*Director of the United States Patent and Trademark Office*

United States Patent
Gustavsson et al.

(10) Patent No.: US 7,616,944 B2
(45) Date of Patent: Nov. 10, 2009

(54) METHOD AND APPARATUS FOR CALL NOTIFICATION AND DELIVERY TO A BUSY MOBILE STATION

(75) Inventors: Roger Gustavsson, Sollentuna (SE); Vibhor Julka, San Diego, CA (US); Anders Lundstrom, LaJolla, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1064 days.

(21) Appl. No.: 10/657,446

(22) Filed: Sep. 8, 2003

(65) Prior Publication Data
US 2004/0092252 A1  May 13, 2004

Related U.S. Application Data

(60) Provisional application No. 60/409,155, filed on Sep. 9, 2002.

(51) Int. Cl.
H04M 11/10 (2006.01)
(52) U.S. Cl. ............ 455/412.2; 455/412.1; 455/413; 370/352; 370/353
(58) Field of Classification Search ......... 455/412.2, 455/412.1–2, 413, 406, 458; 370/338, 88.12, 370/352–356
See application file for complete search history.

(56) References Cited

U.S. PATENT DOCUMENTS

| | | | | |
|---|---|---|---|---|
| 6,111,866 A * | 8/2000 | Kweon et al. | | 370/335 |
| 6,141,556 A * | 10/2000 | Dougherty et al. | | 455/445 |
| 6,307,845 B1 * | 10/2001 | Hummelgren et al. | | 370/328 |
| 6,630,883 B1 * | 10/2003 | Amin et al. | | 340/7.29 |
| 6,636,506 B1 * | 10/2003 | Fan | | 370/356 |
| 6,693,897 B1 * | 2/2004 | Huang | | 370/352 |
| 6,711,401 B1 * | 3/2004 | Chow et al. | | 455/414.1 |
| 6,754,316 B2 * | 6/2004 | Kafri | | 379/93.23 |
| 6,842,622 B2 * | 1/2005 | Peters et al. | | 455/458 |

(Continued)

FOREIGN PATENT DOCUMENTS

EP 0959593 4/1999

(Continued)

OTHER PUBLICATIONS

S. Athalye, L. Chan, D. Ott, R. Sinnarajah; Voice Precedence; 3rd Generation Partnership Project 2 "3GPP2" TSG-A; Mar. 17, 2003, 11 pgs.

Primary Examiner—CongVan Tran
(74) Attorney, Agent, or Firm—Coats & Bennett, P.L.L.C.

(57) ABSTRACT

A call handling method and apparatus provide improved call handling in scenarios where concurrent voice and data service is not supported, or is not possible. A wireless communication network can be configured to provide real-time notifications of incoming voice calls to mobile stations that are busy in data calls, and can route those incoming voice call to voice mail, etc. The network can be configured to attempt call delivery of an incoming voice call to a mobile station busy in a data call with or without prompting the mobile station user, depending on the type of data service the mobile station is engaged in. According to exemplary embodiments, the traffic channel and other resources as desired are retained from the data call for use in supporting the voice call. Also, the mobile stations can be configured to support such notification, reconfiguration and channel retention processing.

14 Claims, 6 Drawing Sheets

FIG. 1